June 25, 1946.     H. W. DIETERT     2,402,738
TEST SAMPLE ASSEMBLY
Original Filed April 10, 1944
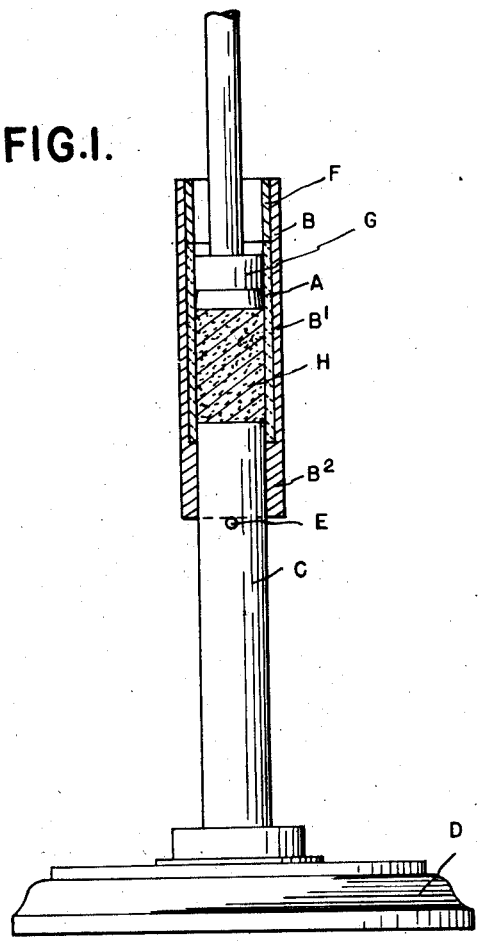
FIG.I.
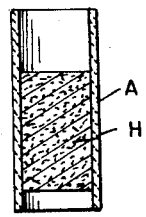
FIG.2.
*INVENTOR.*
HARRY W. DIETERT
BY
ATTORNEYS Patented June 25, 1946

2,402,738

UNITED STATES PATENT OFFICE 2,402,738

TEST SAMPLE ASSEMBLY

Harry W. Dietert, Detroit, Mich.

Original application April 10, 1944, Serial No. 530,404. Divided and this application November 6, 1944, Serial No. 562,240

3 Claims. (Cl. 73—15.6)

The invention relates to the testing of molding materials and forms a division of my copending application for patent, Serial Number 530,404, filed April 10, 1944. The parent application relates to a method and apparatus for testing molding sand to determine characteristics thereof and more particularly to the changes in volume and strength at high temperatures. The subject matter of the instant application is the test sample assembly and means for forming the same as hereinafter described.

In the drawing:

Fig. 1 is a vertical central section through the apparatus for forming the test sample assembly; and Fig. 2 is a similar view of the test package detached from the apparatus.

As stated in the parent application, it is important in testing the characteristics of molding materials to determine the degree of expansion which takes place at elevation temperatures and also the crushing strength of the compacted material at such temperatures. To facilitate making such tests, I have devised a form of test sample assembly in which the molding material is compacted within a refractory open-ended tube under a predetermined pressure. The assembly thus formed is subsequently transferred to a furnace in which it is heated to a predetermined temperature and, while at such temperature, measurement is taken of the linear expansion of the material within the tube. The refractory tube is preferably one formed of silica on account of the exceedingly low coefficient of expansion of this material and also because it is highly refractory. Thus, there is but slight change in dimensions of the tube when heated which facilitates accurate measurement of expansion of the molding material therein.

As illustrated in Fig. 1, A is an open-ended refractory tube. B is a surrounding reinforcing tube having a portion B' of an internal diameter to fit the outer diameter of the tube A and also having a bearing portion B² of an internal diameter corresponding to that of the tube A. C is a post rising from a suitable base D and of a diameter to telescopically engage the bearing B². E is a cross pin engaging an aperture in the post and forming a detachable support for the tube B when telescopically engaged with the post C. This pin is so positioned that the upper end of the post extends slightly into the refractory tube A. F is a bushing placed within the tube B above the refractory tube A, said busing being of an internal diameter corresponding to that of said tube A. G is a ram which is engaged with the upper end of the tube B and is used for compacting the molding material within the refractory tube A.

In the operation of preparing a test sample assembly, a predetermined quantity of molding material such, for instance, as molding sand H, is introduced through the upper end of the tube B and is then compacted by the ram G to a predetermined pressure corresponding to that of a mold to be formed of the sand. The molding sand H and tube A are held together, as illustrated in Fig. 2, solely by the sand being compacted in said tube. The ram G and bushing F are then removed, the pin E disengaged, after which the tube B is telescoped downward on the post C thereby withdrawing it from the tube A. The test sample assembly may then be removed from the post and the molding sand of said assembly is in condition for testing. The reinforcing tube B is an essential element of the test sample assembly forming means as it supports the tube A against radial outward expansion and prevents danger of rupturing said tube during the compacting operation. Also, the reinforcing tube B may be removed without injury to the test sample assembly by telescoping it over the post.

What I claim as my invention is:

1. A test sample assembly comprising an open ended refractory tube capable of retaining its rigidity under high temperature, and molding sand packed under pressure within said tube intermediate the ends thereof, said sand and tube being held together solely by the sand being packed under pressure within said tube.

2. A test sample assembly comprising an open-ended refractory tube capable of retaining its rigidity under high temperature, and highly compacted molding material within said tube which has been compacted therein under a pressure greater than the resistance against rupture of the unsupported tube.

3. A test sample assembly comprising an open-ended refractory tube capable of retaining its rigidity under high temperature, and highly compacted molding material within a central portion of said tube leaving unfilled projecting end portions at opposite ends of the tube, said molding material being compacted to a degree and under a pressure greater than the resistance against rupture of the unsupported tube.

HARRY W. DIETERT.